(12) United States Patent  
Kleinsasser

(10) Patent No.: US 6,336,426 B1
(45) Date of Patent: *Jan. 8, 2002

(54) BOAR CART FOR INSEMINATION OF SOWS

(75) Inventor: Jonathan Kleinsasser, Manitoba (CA)

(73) Assignee: Crystal Spring Colony Farms Ltd., Manitoba (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/412,517

(22) Filed: Oct. 5, 1999

(51) Int. Cl.$^7$ ................................................ A01L 31/07
(52) U.S. Cl. ....................................... 119/453; 119/512
(58) Field of Search ................................. 119/453, 489, 119/497, 482, 496, 502, 512, 513, 514, 519

(56) References Cited

U.S. PATENT DOCUMENTS

| 1,381,892 A | * | 6/1921 | Bute |
| 1,483,377 A | | 2/1924 | Ragsdale et al. |
| 2,729,196 A | * | 1/1956 | Breitenbach |
| 2,821,165 A | * | 1/1958 | Wright |
| 3,785,344 A | | 1/1974 | Patterson |
| 4,171,682 A | | 10/1979 | Merino et al. |
| 4,533,008 A | | 8/1985 | Ostermann |
| 4,763,606 A | | 8/1988 | Ondrasik, II |
| 4,955,318 A | | 9/1990 | Melhorn et al. |
| 4,995,335 A | | 2/1991 | Wright |
| 5,048,460 A | | 9/1991 | Sheaffer |
| 5,113,793 A | * | 5/1992 | Leader et al. ................ 119/453 |
| 5,170,746 A | * | 12/1992 | Roose .......................... 119/20 |
| 5,467,734 A | * | 11/1995 | Ho .............................. 119/453 |
| 5,653,194 A | | 8/1997 | Guy |
| 5,671,697 A | | 9/1997 | Rutman |
| 5,988,110 A | * | 11/1999 | Peterson ....................... 119/453 |

FOREIGN PATENT DOCUMENTS

| CA | 2135623 | | 3/1994 |
| CA | 2270319 | * | 4/1999 |
| CA | 2270319 | | 8/1999 |

OTHER PUBLICATIONS

Photographs (2) of a machine installed in Iowa in 1997–.
Brochure entitled "Swine Robotics Jerome Mack" including a photograph entitled Robotic Boar Buddy.
Photographs (2) of a machine built in Niverville, Manitoba, Canada and used at Select Weanling in Manitoba, Canada in 1998.
Photographs (3) of a machine displayed at a Trade Show in Winnipeg Manitoba, Canada in Dec. 1998 by Danny Kleinsasser.

* cited by examiner

Primary Examiner—Thomas Price
(74) Attorney, Agent, or Firm—Adrian D. Battison

(57) ABSTRACT

A boar cart for carrying a boar through alleyways of a sow insemination area for interaction with the sows during insemination is formed by a cage for containing the boar including a cage floor on which the boar stands, two sides each defined by vertical bars on a respective side of a longitudinal center line of the cage assembly for confining the boar so that the boar is maintained extending longitudinally of the cage, a front and a rear defined by vertical bars, at least one of which can be opened as a door to allow entry and exit. The cage is mounted on rear driving wheels and front steering/caster wheels. The cage is defined by a front portion and a rear portion connected together for pivotal articulated movement about one or two pivot couplings defining a vertical pivot axis arranged substantially at the center line such that the cage can articulate to the left and to the right for navigating left and right corners in the alleyways while the boar is retained in the cage. The length of the cage is reduced by bowing the front and rear bars. The front steering wheels can be set to direct the steering slightly to the left or right so as to tend to guide the cage along one or other side of the alley where it has rollers to run along a rail and hold the boar close to the sows on one side.

16 Claims, 6 Drawing Sheets

BOAR CART FOR INSEMINATION OF SOWS

This invention relates to a boar cart for use in transporting a boar adjacent to a series of pens containing sows during insemination of the sows.

BACKGROUND OF THE INVENTION

In high intensity rearing of pigs, sows after farrowing are moved to an area where they are maintained in separate pens awaiting insemination at the suitable time of estrous. The sows are maintained in separate pens in rows on one or both sides of dividing alleyways so that the farm hand can move along the row of sows both at the front and rear to access the sows for insemination and for various other purposes.

The alleyways between the rows can range in width from 18 inches up to 36 inches in most cases and in some cases the alleyways are wider still. The alleyways are defined between rows of pens and of course at the end of the rows the alley turns through a right angle so that passage can be obtained along one end of the rows and then back between the next set of rows where another right angle turn is required.

It is well known in artificial insemination that it is desirable to bring a boar to the sows both for the purposes of stimulating the sows by close physical contact with the boar and for determining whether a particular sow is in estrous. The presence of the boar is known to improve the effectiveness of the artificial insemination both by allowing the farm hand to more accurately determine the presence of estrous and in addition to place the sow in a more accepting condition for the insemination.

Conventionally a boar is led along the front of the stalls so as to physically contact or approach each sow in turn while the farm hand takes the necessary actions for carrying out insemination of those sows found to be in estrous. This requires the manual handling of a very large powerful animal by one or more additional farm hands.

Attention has therefore been given to design a device which allows the boar to be moved or transported along the alleyway in front of the row of sows in their pens while the farm hand carries out the necessary actions for insemination. It is clearly desirable if such a device is remotely controllable so that the farm hand at the rear of the animal can operate the device to move the boar to the required position adjacent the sow involved.

SUMMARY OF THE INVENTION

It is one object of the present invention to provide an improved boar cart which allows improved control over the movement of the cart.

According to a first aspect of the invention there is provided a boar cart for carrying a boar through alleyways of a sow insemination area for interaction with the sows during insemination comprising:
  a cage assembly for containing the boar including a cage floor on which the boar stands, two cage sides each on a respective side of a longitudinal center line of the cage assembly for confining the boar so that the boar is maintained extending longitudinally of the cage assembly, a cage front and a cage rear for confining the boar against forward and rearward movement;
  the cage assembly having at least one door allowing entry and exit of the boar from the cage assembly;
  the cage assembly being mounted on ground wheels for movement generally longitudinally along an alleyway carrying the boar within the cage assembly;
  the cage assembly having a front portion for receiving the front feet and forward portion of the boar and a rear portion for receiving the rear feet and rearward portion of the boar;
  the front portion being connected to the rear portion for pivotal movement about a vertical pivot axis to allow the cage assembly to navigate around a corner from one alleyway to another.

Preferably the pivotal movement is provided by a pivot coupling defining a vertical pivot axis arranged substantially at the center line such that the cage assembly can articulate to the left and to the right for navigating left and right corners in the alleyways while the boar is retained in the cage assembly.

Preferably the cage assembly includes a roof member parallel to the floor arranged at a top of the side walls and wherein the pivot coupling includes a first bearing member at the floor and a second bearing member at the roof member.

Preferably the side walls interconnect the roof member and the floor.

Preferably the side walls of the front portion are separate from the side walls of the rear portion such that the side walls have a change in spacing therebetween so that they move closer on one side and further apart on the other side as the portions articulate.

Preferably there are provided flexible confining members between the side walls to accommodate said change in spacing.

Preferably the side walls are defined by a plurality of vertical bars allowing access to the boar.

Preferably there is provided a second pivotal coupling thus allowing articulation about two parallel axes on the center line.

Preferably the pivot coupling includes a lock for locking the portions in an aligned position.

Preferably the rear portion includes at least one drive wheel for driving the cage assembly along the alleyways and the front portion includes at least one steerable wheel for guiding the cage assembly along the alleyways.

According to a second aspect of the invention there is provided a boar cart for carrying a boar through alleyways of a sow insemination area for interaction with the sows during insemination comprising:
  a cage assembly for containing the boar including a cage floor on which the boar stands, two cage sides each on a respective side of a longitudinal center line of the cage assembly for confining the boar so that the boar is maintained extending longitudinally of the cage assembly, a cage front and a cage rear for confining the boar against forward and rearward movement;
  the cage assembly having at least one door allowing entry and exit of the boar from the cage assembly;
  the cage assembly being mounted on ground wheels for movement generally longitudinally along an alleyway carrying the boar within the cage assembly;
  the cage assembly having a front portion for receiving the front feet and forward portion of the boar and a rear portion for receiving the rear feet and rearward portion of the boar;
  the front portion and the rear portion being connected together for pivotal articulated movement about a pivot coupling such that the cage assembly can articulate for navigating corners in the alleyways while the boar is retained in the cage assembly;
  at least one of the cage front and the cage rear being bowed outwardly such that a height thereof adjacent the boar projects outwardly relative to the cage floor to thus reduce the length of the floor relative to the total length of the cage assembly to assist in navigating corners.

Preferably the cage front and cage rear are both bowed.

Preferably the gate is arranged at one of the front and rear.

Preferably the front and rear are formed from bars only

According to a third aspect of the invention there is provided a boar cart for carrying a boar along an alleyway of a sow insemination area for interaction with sows on at least one of two sides of the alleyway during insemination comprising:

a cage assembly for containing the boar including a cage floor on which the boar stands, two cage sides each on a respective side of a longitudinal center line of the cage assembly for confining the boar so that the boar is maintained extending longitudinally of the cage assembly, a cage front and a cage rear for confining the boar against forward and rearward movement;

the cage assembly having at least one door allowing entry and exit of the boar from the cage assembly;

the cage assembly being mounted on ground wheels for movement generally longitudinally along an alleyway carrying the boar within the cage assembly;

the cage assembly including a guide arrangement arranged to cooperate with at least one member in the alleyway for guiding the cage assembly along a selected one of the sides of the alleyway and spaced from the other of the sides, the guide assembly being arranged to allow selection of said one side.

Preferably the ground wheels are arranged and adjustable to tend to direct the cage assembly toward a selected one of the sides of the alleyway and away from the other of the sides and wherein there is provided a guide assembly for guiding the cage assembly in movement along said selected one of the sides.

Preferably the ground wheels include at least one rear drive wheel connected to a motor for supporting the cage assembly and for driving the cage assembly along the alleyway and at least one front steering wheel for supporting the cage assembly and for guiding the cage assembly along the alleyway; said at least one front wheel being adjustable and lockable in a predetermined direction to tend to direct the cage assembly in movement toward a selected one of the sides of the alleyway; and the cage assembly having side guide members for contacting a guide element at the selected side of the alleyway such that the cage assembly is directed toward and runs along the guide element at the selected side.

Preferably there are two drive wheels.

Preferably there are two front wheels wherein the wheels are arranged such that, when directed to one side, one wheel is locked and one wheel casters.

Preferably both wheels are selectably lockable and both are free to caster when unlocked.

Preferably the guide members comprise rollers.

BRIEF DESCRIPTION OF THE DRAWINGS

Embodiments of the invention will now be described in conjunction with the accompanying drawings in which.

DETAILED DESCRIPTION

Figure 1:
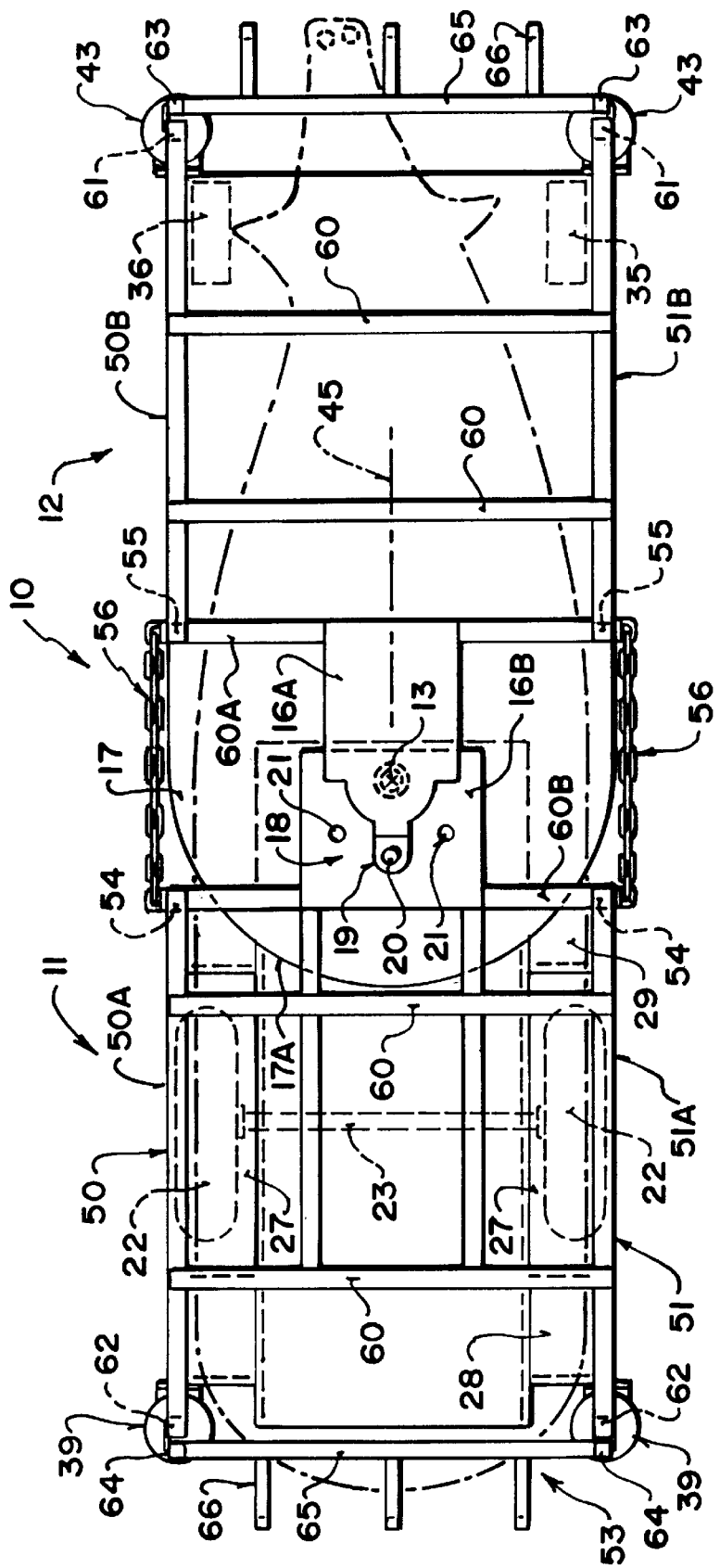
FIG. 1 is a top plan view of a first embodiment of cart according to the present invention showing the cart in the straight ahead position.
Figure 2:
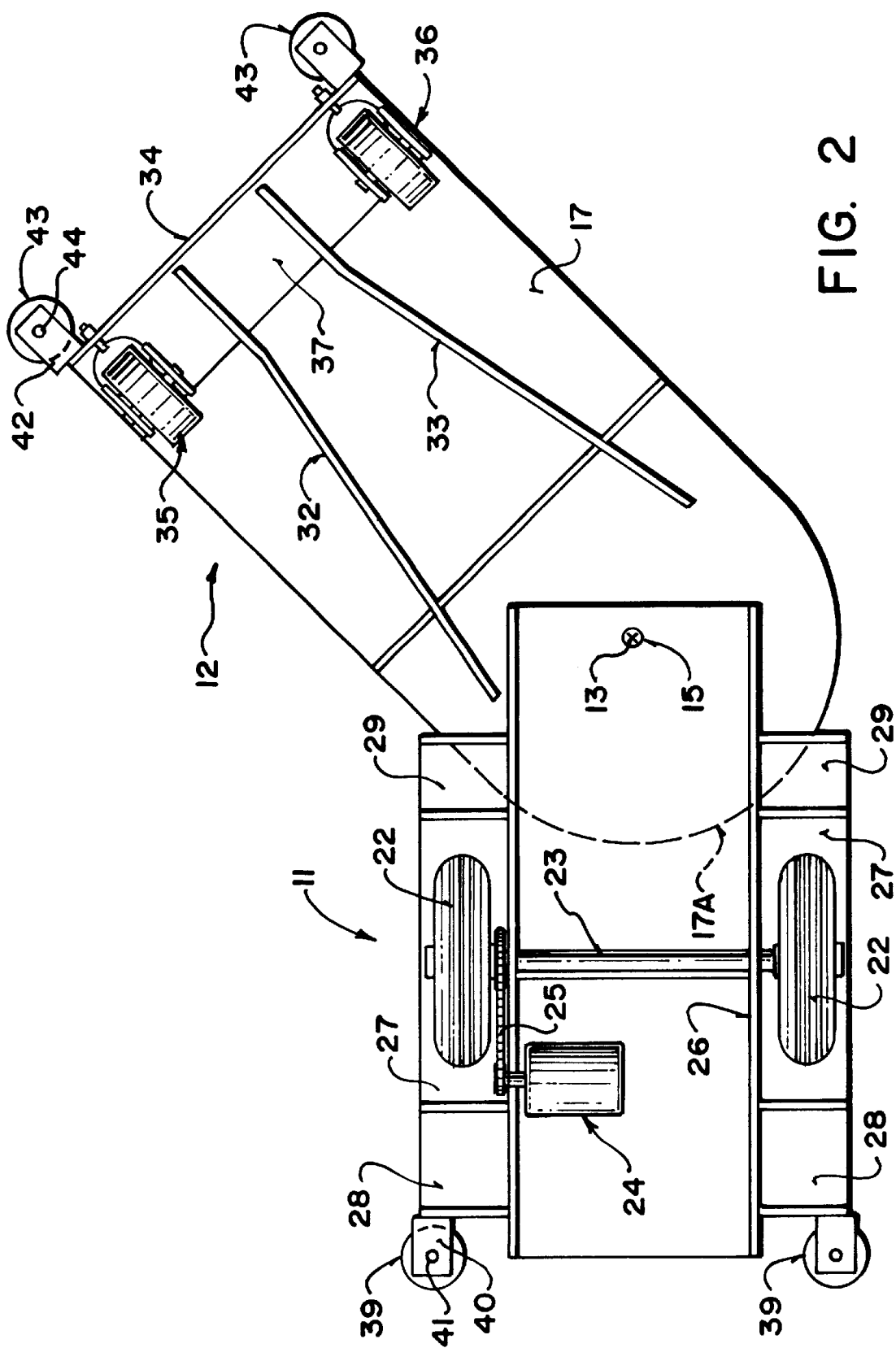
FIG. 2 is a bottom plan view of the cart of FIG. 1 with the cart in its position turned to one side for navigating a right hand corner.
Figure 3:
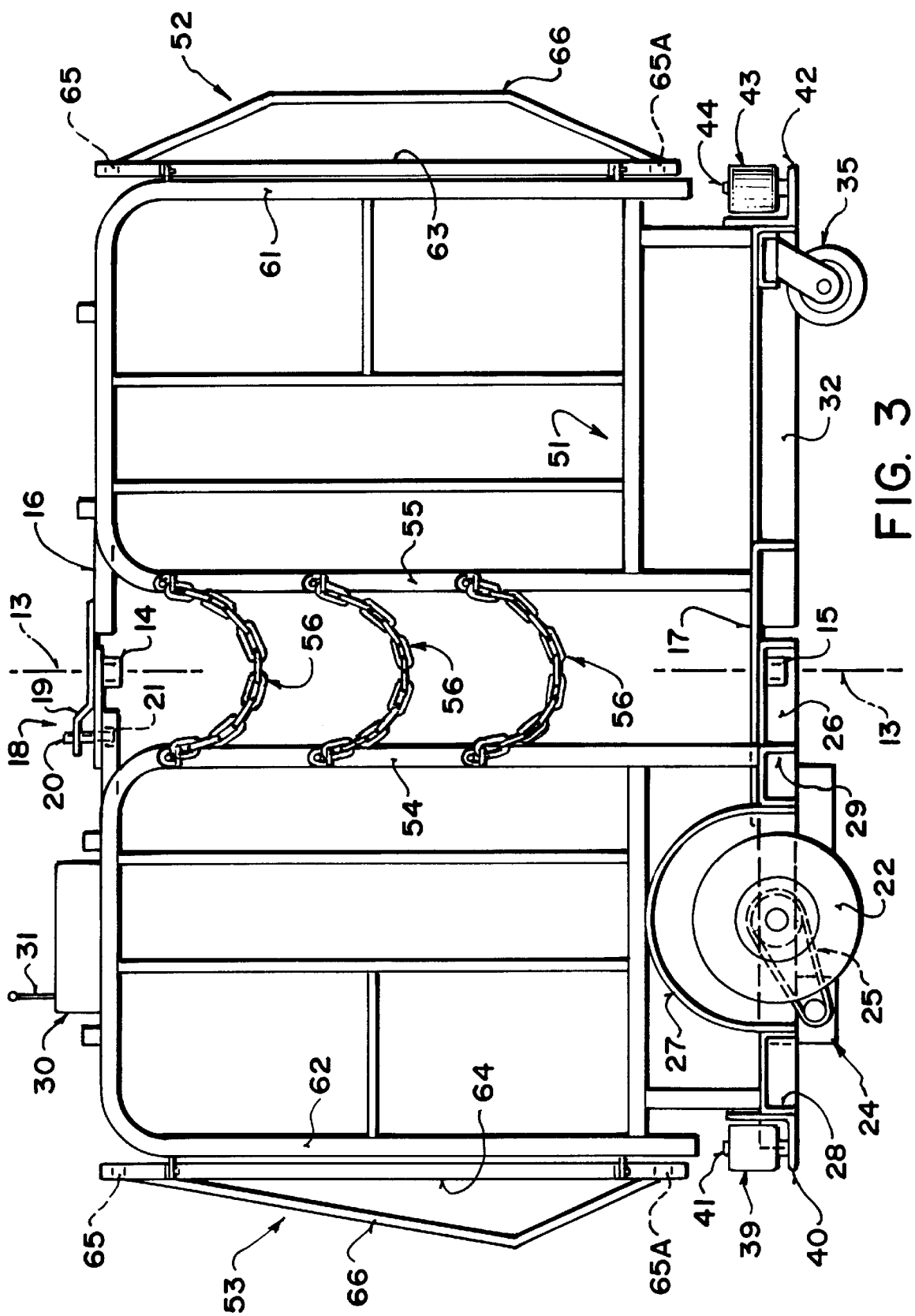
FIG. 3 is a side elevational view of the cart of FIG. 1.

A boar crate is generally indicated at 10 and includes a rear section 11 and a front section 12 which are articulated at a vertical pivot axis 13 allowing the front section to move from a straight ahead aligned position shown in FIG. 1 to either a left hand or right hand turned position, one of which is shown in FIG. 2.

The pivot axis 13 is defined by a top bearing 14 in overlapping top panels 16 of the cart and a bottom bearing 15 in overlapping bottom floor panels 17 of the cart.

The front and rear portions can be locked in the straight ahead position shown in Figure, and preferably in the left and right turned positions, 1 by a pin lock system 18 including an arm 19 connected to the front portion which extends rearwardly over the rear portion to a pull pin 20 which engages into one of three separate holes 21 at the three separate positions. The pull pin 20 is spring biased into a locked position and is moved against the spring bias to a pulled position manually as required.

The rear section 11 is mounted on a pair of drive wheels 22 carried on an axle 23. One or both of the drive wheels is driven by a motor 24 communicating through a drive chain 25 mounted at or beneath the floor 17. The wheels 22 are mounted each on a respective side of a main longitudinal rail 26 of the section 11 with each wheel being covered at its position outside of the respective rail 26 by a fender 27. The fenders 27 each extend between frame channel members 28 and 29 extending outwardly from the rails 26 to a respective side. Between the rails 26 is defined a floor on which the rear part of the animal and the rear legs of the animal stand.

The motor 24 is controlled by an electrical control system 30 provided within a housing on the top 16 of the cart. The electrical control system 30 includes an antenna 31 which receives communications from a remote control system using a suitable communication medium so that the farm hand can remotely operate the cart to drive the wheels 22 forwardly and rearwardly as required. The wheels 22 are not steering wheels and simply drive the cart forwardly and rearwardly.

The front section 12 includes a planar floor panel 17 which is supported by rails 32 and 33 extending rearwardly from a forward edge 34 of the floor panel and diverging outwardly so as to leave a rear area of the floor panel 17 at the bearing 15 which overlies a front rectangular section of the floor 17 of the rear portion of the cart. A rear edge of the floor panel 17 of the front section defines a semi circular rear line 17A surrounding the bearing 15 and the axis 13 and this rear portion can therefore sweep over the top surface of the rear floor panel and moves in front of the wheels 22 and in front of the fenders 27.

The front portion 12 is mounted on a pair of castor wheels 35 and 36 carried on the underside of a transverse brace 37 at the front edge 34. Thus the direction of movement of the cart is controlled by the castor wheels as described hereinafter.

The rear channel members 28 of the rear section 11 each carry a bumper or guide roller 39 which is carried on a bracket 40 allowing rotation of the guide roller about a vertical mounting pin 41. Similarly a bracket 42 on the brace 37 carries a front bumper roller 43 pivotal about a vertical pin 44. The bumper rollers 39 and 43 are thus mounted at a common height on the front and rear portions and project outwardly therefrom slightly to each side and at a position in front of and rearwardly of respectively the front and rear edges of the floor panels 17.

The bumper rollers 39, 43 are mounted at a height which coincides with a suitable rail on the pens at the side of the alleyway against which or adjacent which the cart is intended to run.

The pivot axis 13 is arranged so that it lies on or adjacent a center line 45 of the cart in its aligned position shown in FIG. 1. The axis 13 is also approximately midway between the front edge 34 of the front portion and the rear edge of the rear portion. Thus the pivotal action provides articulation of the two portions to a position which the angle of the center line of the front portion is arranged approximately at 45° to the center line of a rear portion. This is of course symmetrical in both left and right directions in view of the fact that the pivot axis lies on the center line.

The cart is further formed by two side walls 50 and 51 the front wall 52 and a rear wall 53. Each of these walls is formed by bars allowing visual and direct physical access to the animal within the cart over the full area of the cart both to the rear, the front and the sides. The side walls are divided into two sections such that the rear portion 11 has its own side wall section 50A, 51A and the front section has its own side wall section 50B, 51B. The side wall 51A terminates at a front post 54 and the side wall 51B terminates at a rear post 55 with those posts separated rearwardly and forwardly respectively of the pivot axis 13. There is no direct rigid connection between the posts 54 and 55 so that the pivotal action about the axis 13 allows the post 54 and 55 to move closer together as the cart articulates to one side and to move further apart as the cart articulates to the other side. The post 54 and 55 are however connected by loose flexible chains 56 which have respective ends connected to the respective posts and which hang down as a loose connection bridging the space between the posts and acting the confine the animal in the area between the post to ensure that the animal is prevented from escape between the posts.

The side walls including the main mounting posts are attached to the floor so as to stand upwardly therefrom adjacent the outermost edge thereof and particularly the rear side walls stand upwardly from the outer edge of the portions 28 and 29. The top of the side rails are connected by transverse bars 60 which maintain the side walls in fixed vertical position and also provide a top or roof structure again providing the animal and prevent it from jumping upwardly to attempt to escape over the side walls. The top bearing 14 is connected to overlapping panels 16A and 16B carried respectively by a rear rail 60A of the front part and a front rail 60B of the rear part. The cage assembly may include flat closed panels covering or replacing the bars for additional strength if required.

The front wall 52 and the rear wall 53 are both formed as separate pivotal elements attached to a front post 61 of the front section and to a rear post 62 of the rear section respectively. Thus the front wall 52 includes two side posts 63 which can be pinned to respective ones of the posts 61 to hold the front wall fixed in place. Similarly the rear wall 53 includes posts 64 which can be pinned to the post 62 to hold the rear wall in place. One of or both of the front and rear walls can be removed by simply removing the pins so that the wall can be totally removed or can be removed at one side or disconnected from its respective post and pivoted away from the other post to allow access for entry or exit of the animal. Preferably both the front and rear walls are pivotal for removal in this manner so as to allow the animal to enter from the rear and exit from the front.

The front and rear walls further include top and bottom rails 64 and 65 respectively which extend across horizontally and interconnect the posts. Furthermore, the front and rear walls further include confining bars 66 which extend generally vertically downwardly from the top rail 64 to the bottom rail 65. Each of these bars 66 is bowed outwardly from the main plane containing the rail 64 and 65 so that a center section of the bars above the floor projects outwardly from the plane of the wall so as to increase the area within the cart which is accessible for the animal at the height of the rump and the nose of the animal which is approximately midway at the height of the cart and spaced upwardly from the floor. This bowing of the front and rear gates thus allows a reduction in the length of the whole of the cart thus reducing the distance between the front edge of the front section and the rear edge of the rear section and reducing the distance between the bumper rollers 39 and 43 so that the overall length of the cart is significantly reduced while the length of animal which can be accommodated between the outermost points of the bar 66 remains equal to the required length depending upon the size of the animal.

As shown in FIG. 1, the boar is schematically within the cart and, although the size of the boars used will of course vary, the cart is designed to take effectively the largest type of boar which would be used and this boar would wholly fill the cart so that its sides touch the side walls, its rump reaches the outwardly bowed section of the bar 66 at the rear of the rear section and its nose projects through or just reaches the bars 66 at the front of the front section. The animal is thus wholly contained and confined and the cart has dimensions which are significantly greater than the size of the animal itself.

Figure 4:
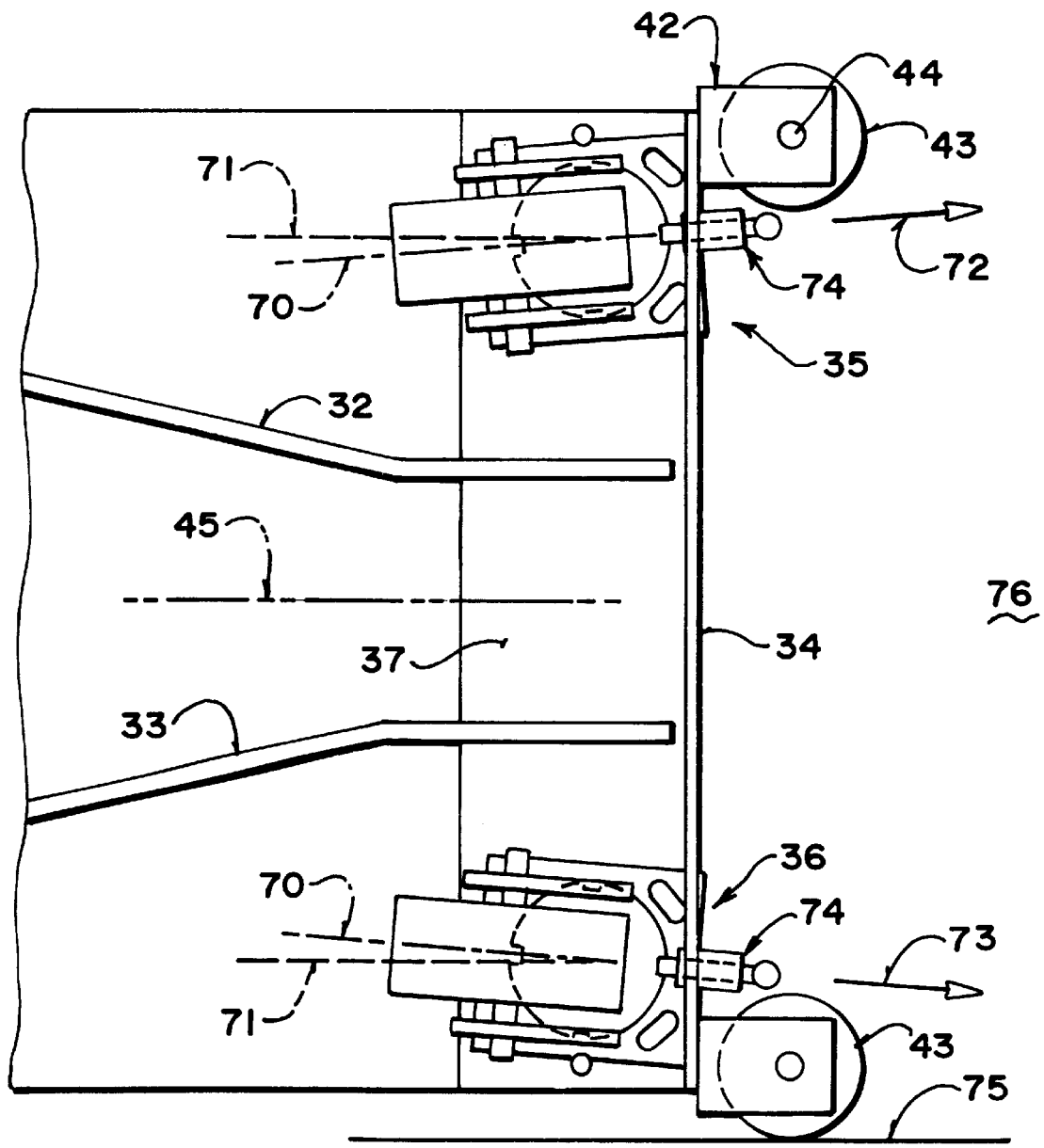
FIG. 4 is a bottom plan view similar to that of FIG. 2 showing more detail of the front steering/caster wheels.

Turning now to FIG. 4, further detail of the castor wheels 35 and 36 is shown. It will be noted firstly that the castor wheels are mounted on the underside of the cross brace 37 such that the normal forward direction 70 of the castor is offset at a slight angle to the longitudinal direction 71 of the cart which is parallel to the center line 45. Thus the left hand castor wheel 35 is normally inclined slightly outwardly in a direction forwardly and outwardly as indicated at 72 and the castor wheels 36 is similarly inclined slightly forwardly and outwardly as indicated at 73.

Each castor wheel can be locked in its normal forward direction by a locking pin 74 of a type which is commercially available so that the castor 35, 36 can be locked in its forward direction, 72, 73 or can simply castor as required depending upon the position of the lock 74.

In operation, if it is required that the cart remain alongside the side rail 75 adjacent the castor 36, the castor 36 is locked and the castor 35 is released to be free to castor. Thus both castor wheels will take up a position normally tending to move along the direction 73 thus tending to push the cart as it moves forwardly toward the rail 75 on one side of the alley 76.

Therefore in a situation where there are sows on both sides of the alley 76, the farm hand can select that side of the alley to which the cart tends to move by locking the wheel on that side and releasing the wheel on the other side. Thus as the cart moves forwardly it also tends to push toward one side so that the bumper rollers on that side tend to run along the rail 75.

In some cases the alley is relatively narrow so that the cart in effect just fits between the rails and moves along the alleyway equidistant from each of the rails. In this case both wheels may be set to caster.

However in other arrangements, the alleyway may be significantly wider and it is therefore desired to hold the cart to the side adjacent those sows which are being operated upon by the farm hand. Thus this simple steering system avoids the necessity for remote controlled steering and simply ensures that the cart remains adjacent the required side of the alleyway. The bumper rollers hold the cart at the required position and gently guide the cart as it moves along the alleyway. It will be appreciated that the movement of the cart is very slow in that the cart is often maintained stationary for a period of time and then stepped forward to a next pen of the next adjacent sow.

Figure 5:
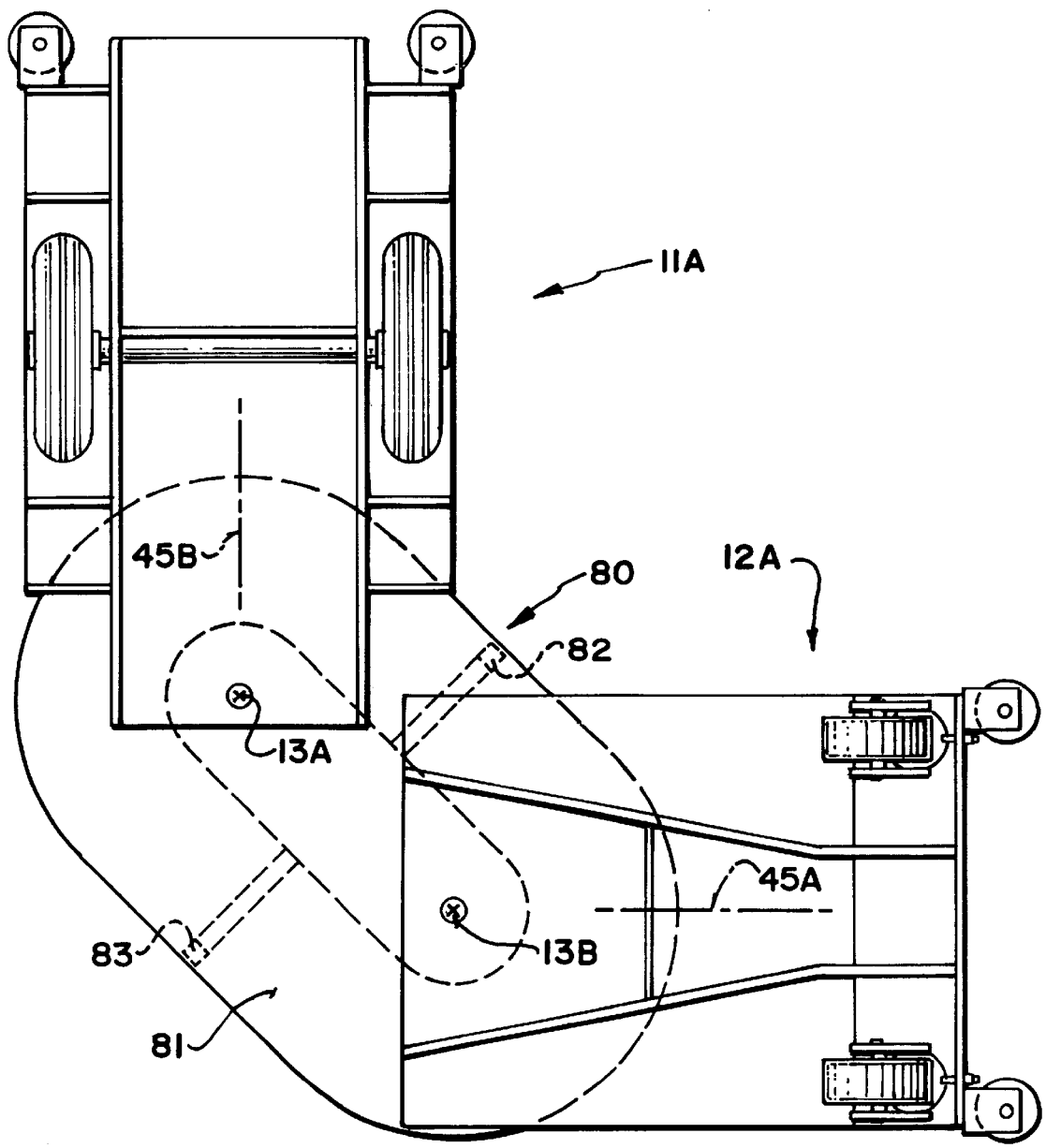
FIG. 5 is a bottom plan view similar to that of FIG. 2 showing a second embodiment according to the present invention.

Turning now to FIG. 5, there is shown an arrangement which is substantially identical to that of FIGS. 1 through 4 except that the front section 12A is articulated relative to the rear section 11A by two pivot axes 13A and 13B. This is effected by the provision of an intermediate section 80 defined by a floor panel 81 and two vertical posts 82 and 83 connecting to a top structure 85. Thus the axes 13A and 13B are again defined by top and bottom bearings at the floor panel 81 and at the top panel 85.

The double articulation arrangement of FIG. 5 thus allows an increased angle between the front section and the rear section in the articulated position and in particular an arrangement in which the center line 45A of the front section lies at 90° to the center line 45B of the rear section. This of course requires the animal to accommodate a larger angle of bend between its rear and its front section but this allows the cart to move more effectively around a right angle corner particularly where the alleyways are very narrow.

The arrangement has the advantage therefore that the animal can be maintained within the cart at all times while the cart is moved along alleyways and round corners onto the next adjacent alleyway and there is no necessity to remove the animal with the difficulty of returning it to its position should it have any reluctance. The animal is therefore always confined and can be handled by a single farm hand by the remote operation while the farm hand operates upon the sows in conventional manner.

In an alternative arrangement (not shown) the pivot coupling is offset from the center line but this arrangement is less advantageous in that it may be necessary to remove the boar from the cart to navigate certain or all corners.

Figure 6:
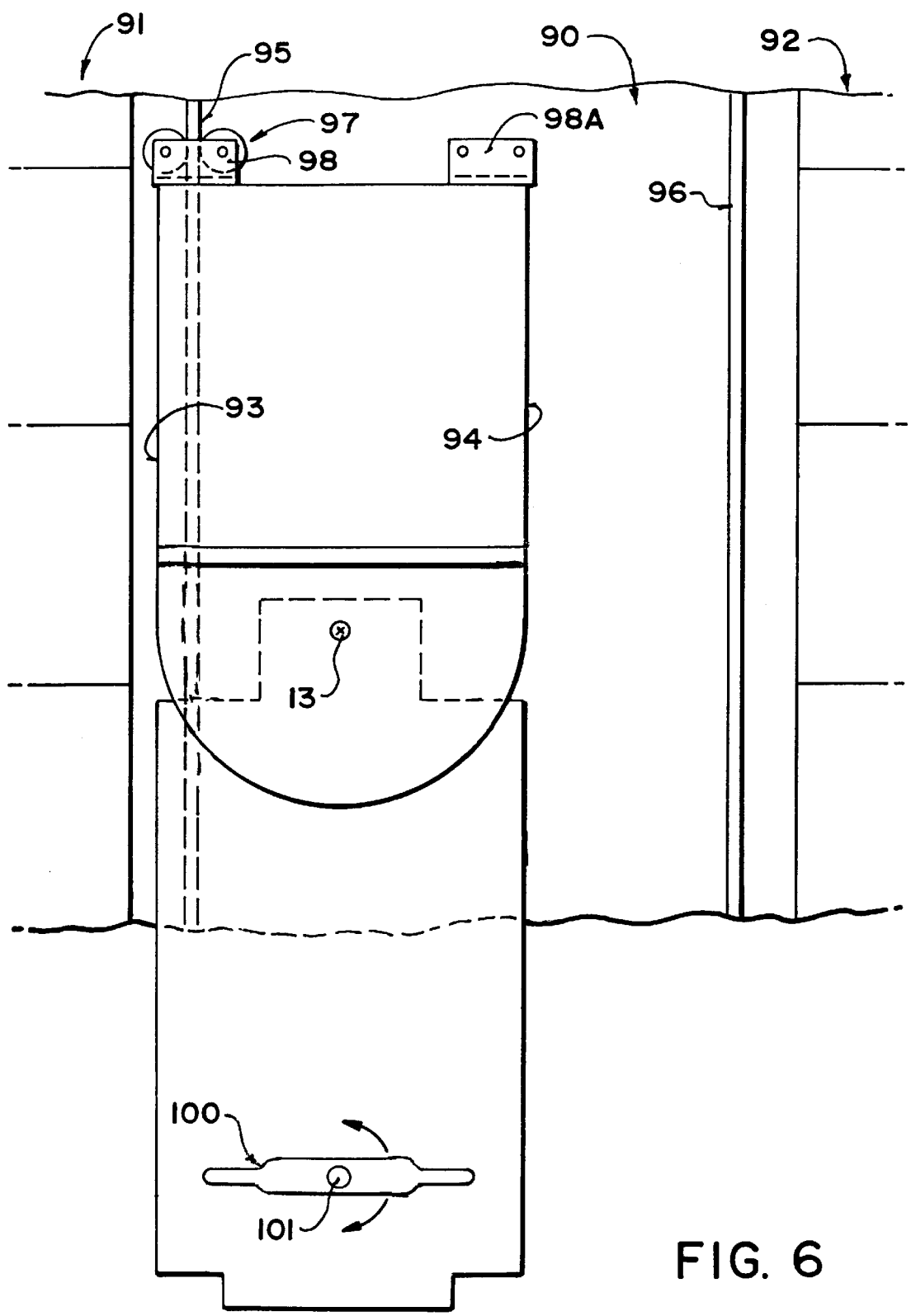
FIG. 6 is a top plan view similar to that of FIG. 4 showing a further embodiment according to the present invention.

Turning now to FIG. 6 there is shown in top plan view schematically an alleyway 90 having a first row of pens 91 on one side and a second row pens 92 on the other side of the alleyway. The width of the alleyway is greater than the width of the cart so that the cart can be adjusted so that it runs with one side 93 adjacent the pen 91 and the other side 94 spaced away from the pens 92 and by vice versa.

Various arrangements for guiding the movement of the cart along the respective selected side can be provided including the arrangement shown previously in FIG. 4. However an alternative arrangement is shown in FIG. 6 and this includes a pair of guide tracks 95 and 96 which are provided in the alleyway at a suitable location and preferably adjacent the respective line of pens. The tracks 95, 96 and be provided by raised rails cast in or attached to the concrete of the alleyway or can be provided by another ridge or groove in the concrete which thus forms a continuous line or track along the concrete for holding the cart along a predetermined line adjacent the respective selected side.

In the embodiment shown, the track 95 or 96 is followed by a pair of rollers 97 which are attached to the cart on a bracket 98 which can be moved from the lefthand position shown to a righthand position 98A to guide the cart along the selected one of the tracks 95, 96.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A boar cart for carrying a boar through alleyways of a sow insemination area for interaction with the sows during insemination comprising:

a cage assembly for containing the boar including a cage floor on which the boar stands, two cage sides each on a respective side of a longitudinal center line of the cage assembly for confining the boar so that the boar is maintained extending longitudinally of the cage assembly, a cage front and a cage rear for confining the boar against forward and rearward movement;

the cage assembly having at least one door allowing entry and exit of the boar from the cage assembly;

the cage assembly being mounted on ground wheels for movement generally longitudinally along an alleyway carrying the boar within the cage assembly;

the cage assembly having a front portion for receiving the front feet and forward portion of the boar and a rear portion for receiving the rear feet and rearward portion of the boar;

the front portion being connected to the rear portion for pivotal movement about at least one vertical pivot axis to allow the cage assembly to navigate around a corner from one alleyway to another;

wherein the pivotal movement is provided by a pivot coupling locating the at least one vertical pivot axis substantially at the center line such that the cage assembly can articulate from a straight ahead aligned position both to the left and to the right for navigating left and right corners in the alleyways while the boar is retained in the cage assembly.

2. The boar cart according to claim 1 wherein the cage assembly includes a top member parallel to the floor arranged at a top of the side walls and wherein the pivot coupling includes a first bearing member at the floor and a second bearing member at the top member.

3. The boar cart according to claim 2 wherein the front portion includes a front portion of the floor and the rear portion includes a rear portion of the floor with the front portion of the floor and the rear portion of the floor being arranged to overlap at the straight ahead position and when articulated to the left and to the right to allow the boar to stand on the floor while the boar is retained in the cage assembly.

4. The boar cart according to claim 3 wherein the side walls of the front portion are separate from the side walls of the rear portion such that the side walls have a change in spacing therebetween during articulating to the left and the right so that they move closer on one side and further apart on the other side as the portions articulate.

5. The boar cart according to claim 4 wherein there are provided flexible confining members between the side walls arranged to accommodate said change in spacing.

6. The boar cart according to claim 1 wherein the side walls are defined by a plurality of vertical bars.

7. The boar cart according to claim 1 wherein the pivotal coupling defines two longitudinally spaced parallel axes each substantially on the center line.

8. The boar cart according to claim 1 wherein the pivot coupling includes a lock for locking the front and rear portions in a straight ahead aligned position.

9. The boar cart according to claim 1 wherein the cage assembly includes at least one drive wheel for driving the cage assembly along the alleyways and at least one steerable wheel for guiding the cage assembly along the alleyway.

10. A boar cart for carrying a boar through alleyways of a sow insemination area for interaction with the sows during insemination comprising:

a cage assembly for containing the boar including a cage floor on which the boar stands, two cage sides each on a respective side of a longitudinal center line of the cage assembly for confining the boar so that the boar is maintained extending longitudinally of the cage assembly, a cage front and a cage rear for confining the boar against forward and rearward movement;

the cage assembly having at least one door allowing entry and exit of the boar from the cage assembly;

the cage assembly being mounted on ground wheels for movement generally longitudinally along an alleyway carrying the boar within the cage assembly;

the cage assembly having a front portion for receiving the front feet and forward portion of the boar and a rear portion for receiving the rear feet and rearward portion of the boar;

the front portion and the rear portion being connected together for pivotal articulated movement about a pivot coupling such that the cage assembly can articulate for navigating corners in the alleyways;

the cage floor and the pivot coupling being arranged such that the boar can remain in the cage assembly while navigating corners;

the cage floor having at front and rear corners thereof front and rear guide members for contacting abutments in the alleyways for guiding movement of the front and rear portions along the alleyways;

at least one of the cage front and the cage rear being bowed outwardly relative to the cage floor such that, at a height of the cage front and the cage rear adjacent the boar, the length of the cage assembly between the cage front and the cage rear is greater than the length of the cage floor between the front and rear guide members to assist in navigating corners.

11. The boar cart according to claim 10 wherein the cage front and the cage rear are both bowed.

12. The boar cart according to claim 10 wherein the gate is arranged at one of the cage front and the cage rear.

13. The boar cart according to claim 10 wherein the cage front and the cage rear are formed from bars only.

14. The boar cart according to claim 1 wherein at least one of the cage front and the cage rear is bowed outwardly relative to the cage floor such that, at a height of the cage front and the cage rear adjacent the boar, the length of the cage assembly between the cage front and the cage rear is greater than the length of the cage floor between the front and rear guide members to assist in navigating corners.

15. The boar cart according to claim 14 wherein the cage front and the cage rear are both bowed.

16. A boar cart for carrying a boar through alleyways of a sow insemination area for interaction with the sows during insemination comprising:

a cage assembly for containing the boar including a cage floor on which the boar stands, two cage sides each on a respective side of a longitudinal center line of the cage assembly for confining the boar so that the boar is maintained extending longitudinally of the cage assembly, a cage front and a cage rear for confining the boar against forward and rearward movement;

the cage assembly having at least one door allowing entry and exit of the boar from the cage assembly;

the cage assembly being mounted on ground wheels for movement generally longitudinally along an alleyway carrying the boar within the cage assembly;

the cage assembly having a front portion for receiving the front feet and forward portion of the boar and a rear portion for receiving the rear feet and rearward portion of the boar;

the front portion being connected to the rear portion for pivotal movement about a vertical pivot axis to allow the cage assembly to navigate around a corner from one alleyway to another;

the front portion includes a front portion of the floor and the rear portion includes a rear portion of the floor with the front portion of the floor and the rear portion of the floor being arranged to overlap at the straight ahead position and when articulated to the left and to the right to allow the boar to stand on the floor while the boar is retained in the cage assembly.

* * * * *